(12) United States Patent
Cape et al.

(10) Patent No.: US 8,755,121 B2
(45) Date of Patent: Jun. 17, 2014

(54) LASER MARKED DEVICE

(75) Inventors: Samuel M. Cape, Woodstock, GA (US);
Jonathan D. Gosnell, Atlanta, GA (US);
Kaj Markkus Helminen, Rönninge
(SE); Gregory R. Jordan, Cumming,
GA (US); Scott K. Palm, Milton, GA
(US); Giles D. Prett, Dalton, MA (US);
Timothy W. Schneider, Cumming, GA
(US); Anthony J. Zucchero, Smyrna,
GA (US)

(73) Assignees: Crane & Co., Inc., Dalton, MA (US);
Crane AB, Tumba (SE); **Visual Physics,
LLC**, Alpharetta, GA (US)

( * ) Notice: Subject to any disclaimer, the term of this patent is extended or adjusted under 35 U.S.C. 154(b) by 120 days.

(21) Appl. No.: 13/360,017

(22) Filed: Jan. 27, 2012

(65) Prior Publication Data

US 2012/0194916 A1 Aug. 2, 2012

Related U.S. Application Data

(60) Provisional application No. 61/437,157, filed on Jan. 28, 2011.

(51) Int. Cl.
*G02B 27/10* (2006.01)
*B42D 15/00* (2006.01)
*G02B 3/00* (2006.01)

(52) U.S. Cl.
CPC .................................... *G02B 3/0056* (2013.01)
USPC ............................................. 359/619; 283/86

(58) Field of Classification Search
USPC ..................... 359/619, 626; 283/86
See application file for complete search history.

(56) References Cited

U.S. PATENT DOCUMENTS

| | | | |
|---|---|---|---|
| 992,151 A | 5/1911 | Berthon |
| 1,824,353 A | 9/1931 | Jensen |
| 1,849,036 A | 3/1932 | Ernst |
| 1,942,841 A | 1/1934 | Shimizu |
| 2,268,351 A | 12/1941 | Tanaka |
| 2,355,902 A | 8/1944 | Berg |
| 2,432,896 A | 12/1947 | Hotchner |

(Continued)

FOREIGN PATENT DOCUMENTS

AU 2009278275 7/2012
CN 1126970 11/2003

(Continued)

OTHER PUBLICATIONS

Gale, M. T., et al., Chapter 6—Replication, Micro Optics: Elements, Systems and Applications, 1997, pp. 153-177.

(Continued)

*Primary Examiner* — William Choi
(74) *Attorney, Agent, or Firm* — Holland & Bonzagni, P.C.; Mary R. Bonzagni, Esq.

(57) ABSTRACT

An optical device projecting one or more synthetically magnified images that has been laser marked with one or more static two dimensional (2D) images is provided. The static 2D image(s) laser marked on or within this device and the synthetically magnified image(s) projected by this device help determine the authenticity of a document (e.g., passport data page) or product that employs it. Several embodiments of the inventive device also offer increased resistance to tampering or alteration and wear.

33 Claims, 4 Drawing Sheets

(56) References Cited

U.S. PATENT DOCUMENTS

| | | |
|---|---|---|
| 2,888,855 A | 6/1959 | Tanaka |
| 2,992,103 A | 7/1961 | Land et al. |
| 3,122,853 A | 3/1964 | Koonz et al. |
| 3,241,429 A | 3/1966 | Rice et al. |
| 3,264,164 A | 8/1966 | Jerothe et al. |
| 3,312,006 A | 4/1967 | Rowland |
| 3,357,772 A | 12/1967 | Rowland |
| 3,463,581 A | 8/1969 | Clay |
| 3,609,035 A | 9/1971 | Ataka |
| 3,643,361 A | 2/1972 | Eaves |
| 3,704,068 A | 11/1972 | Waly |
| 3,811,213 A | 5/1974 | Eaves |
| 3,887,742 A | 6/1975 | Reinnagel |
| 4,025,673 A | 5/1977 | Reinnagel |
| 4,073,650 A | 2/1978 | Yevick |
| 4,082,426 A | 4/1978 | Brown |
| 4,185,191 A | 1/1980 | Stauffer |
| 4,345,833 A | 8/1982 | Siegmund |
| 4,417,784 A | 11/1983 | Knop et al. |
| 4,498,736 A | 2/1985 | Griffin |
| 4,507,349 A | 3/1985 | Fromson et al. |
| 4,534,398 A | 8/1985 | Crane |
| 4,634,220 A | 1/1987 | Hockert et al. |
| 4,645,301 A | 2/1987 | Orensteen et al. |
| 4,662,651 A | 5/1987 | Mowry, Jr. |
| 4,688,894 A | 8/1987 | Hockert |
| 4,691,993 A | 9/1987 | Porter et al. |
| 4,756,972 A | 7/1988 | Kloosterboer et al. |
| 4,765,656 A | 8/1988 | Becker et al. |
| 4,814,594 A | 3/1989 | Drexler |
| 4,892,336 A | 1/1990 | Kaule et al. |
| 4,892,385 A | 1/1990 | Webster, Jr. et al. |
| 4,920,039 A | 4/1990 | Fotland et al. |
| 4,935,335 A | 6/1990 | Fotland |
| 4,988,126 A | 1/1991 | Heckenkamp et al. |
| 5,074,649 A | 12/1991 | Hamanaka |
| 5,085,514 A | 2/1992 | Mallik et al. |
| 5,211,424 A | 5/1993 | Bliss |
| 5,215,864 A | 6/1993 | Laakmann |
| 5,232,764 A | 8/1993 | Oshima |
| 5,254,390 A | 10/1993 | Lu |
| 5,359,454 A | 10/1994 | Steenblik et al. |
| 5,384,861 A | 1/1995 | Mattson et al. |
| 5,393,099 A | 2/1995 | D'Amato |
| 5,433,807 A | 7/1995 | Heckenkamp et al. |
| 5,449,200 A | 9/1995 | Andric et al. |
| 5,461,495 A | 10/1995 | Steenblik et al. |
| 5,464,690 A | 11/1995 | Boswell |
| 5,468,540 A | 11/1995 | Lu |
| 5,479,507 A | 12/1995 | Anderson |
| 5,492,370 A | 2/1996 | Chatwin et al. |
| 5,555,476 A | 9/1996 | Suzuki et al. |
| 5,568,313 A | 10/1996 | Steenblik et al. |
| 5,575,507 A | 11/1996 | Yamauchi et al. |
| 5,598,281 A | 1/1997 | Zimmerman et al. |
| 5,623,347 A | 4/1997 | Pizzanelli |
| 5,623,368 A | 4/1997 | Calderini et al. |
| 5,626,969 A | 5/1997 | Joson |
| 5,631,039 A | 5/1997 | Knight et al. |
| 5,639,126 A | 6/1997 | Dames et al. |
| 5,642,226 A | 6/1997 | Rosenthal |
| 5,643,678 A | 7/1997 | Boswell |
| 5,670,003 A | 9/1997 | Boswell |
| 5,674,580 A | 10/1997 | Boswell |
| 5,688,587 A | 11/1997 | Burchard et al. |
| 5,695,346 A | 12/1997 | Sekiguchi et al. |
| 5,712,731 A | 1/1998 | Drinkwater et al. |
| 5,723,200 A | 3/1998 | Oshima et al. |
| 5,737,126 A | 4/1998 | Lawandy |
| 5,753,349 A | 5/1998 | Boswell |
| 5,759,683 A | 6/1998 | Boswell |
| 5,783,017 A | 7/1998 | Boswell |
| 5,800,907 A | 9/1998 | Yumoto |
| 5,810,957 A | 9/1998 | Boswell |
| 5,812,313 A | 9/1998 | Johansen et al. |
| 5,886,798 A | 3/1999 | Staub et al. |
| 5,933,276 A | 8/1999 | Magee |
| 5,995,638 A | 11/1999 | Amidror et al. |
| 6,030,691 A | 2/2000 | Burchard et al. |
| 6,036,230 A | 3/2000 | Färber |
| 6,036,233 A | 3/2000 | Braun et al. |
| 6,060,143 A | 5/2000 | Tompkin et al. |
| 6,084,713 A | 7/2000 | Rosenthal |
| 6,089,614 A | 7/2000 | Howland et al. |
| 6,106,950 A | 8/2000 | Searle et al. |
| 6,176,582 B1 | 1/2001 | Grasnick |
| 6,179,338 B1 | 1/2001 | Bergmann et al. |
| 6,195,150 B1 | 2/2001 | Silverbrook |
| 6,256,149 B1 | 7/2001 | Rolfe |
| 6,256,150 B1 | 7/2001 | Rosenthal |
| 6,283,509 B1 | 9/2001 | Braun et al. |
| 6,288,842 B1 | 9/2001 | Florczak et al. |
| 6,301,363 B1 | 10/2001 | Mowry, Jr. |
| 6,328,342 B1 | 12/2001 | Belousov et al. |
| 6,329,040 B1 | 12/2001 | Oshima et al. |
| 6,345,104 B1 | 2/2002 | Rhoads |
| 6,348,999 B1 | 2/2002 | Summersgill et al. |
| 6,350,036 B1 | 2/2002 | Hannington et al. |
| 6,369,947 B1 | 4/2002 | Staub et al. |
| 6,373,965 B1 | 4/2002 | Liang |
| 6,381,071 B1 | 4/2002 | Dona et al. |
| 6,414,794 B1 | 7/2002 | Rosenthal |
| 6,424,467 B1 | 7/2002 | Goggins |
| 6,450,540 B1 | 9/2002 | Kim |
| 6,467,810 B2 | 10/2002 | Taylor et al. |
| 6,473,238 B1 | 10/2002 | Daniell |
| 6,500,526 B1 | 12/2002 | Hannington |
| 6,542,646 B1 | 4/2003 | Bar-Yona |
| 6,558,009 B2 | 5/2003 | Hannington et al. |
| 6,587,276 B2 | 7/2003 | Daniell |
| 6,616,803 B1 | 9/2003 | Isherwood et al. |
| 6,641,270 B2 | 11/2003 | Hannington et al. |
| 6,671,095 B2 | 12/2003 | Summersgill et al. |
| 6,712,399 B1 | 3/2004 | Drinkwater et al. |
| 6,721,101 B2 | 4/2004 | Daniell |
| 6,724,536 B2 | 4/2004 | Magee |
| 6,726,858 B2 | 4/2004 | Andrews |
| 6,751,024 B1 | 6/2004 | Rosenthal |
| 6,761,377 B2 | 7/2004 | Taylor et al. |
| 6,795,250 B2 | 9/2004 | Johnson et al. |
| 6,803,088 B2 | 10/2004 | Kaminsky et al. |
| 6,819,775 B2 | 11/2004 | Amidror et al. |
| 6,833,960 B1 | 12/2004 | Scarbrough et al. |
| 6,856,462 B1 | 2/2005 | Scarbrough et al. |
| 6,870,681 B1 | 3/2005 | Magee |
| 6,900,944 B2 | 5/2005 | Tomczyk |
| 6,935,756 B2 | 8/2005 | Sewall et al. |
| 7,030,997 B2 | 4/2006 | Neureuther et al. |
| 7,058,202 B2 | 6/2006 | Amidror |
| 7,068,434 B2 | 6/2006 | Florczak et al. |
| 7,114,750 B1 | 10/2006 | Alasia et al. |
| 7,194,105 B2 | 3/2007 | Hersch et al. |
| 7,246,824 B2 | 7/2007 | Hudson |
| 7,254,265 B2 | 8/2007 | Naske et al. |
| 7,255,911 B2 | 8/2007 | Lutz et al. |
| 7,288,320 B2 | 10/2007 | Steenblik et al. |
| 7,333,268 B2 | 2/2008 | Steenblik et al. |
| 7,336,422 B2 | 2/2008 | Dunn et al. |
| 7,372,631 B2 | 5/2008 | Ozawa |
| 7,389,939 B2 | 6/2008 | Jones et al. |
| 7,422,781 B2 | 9/2008 | Gosselin |
| 7,457,038 B2 | 11/2008 | Dolgoff |
| 7,457,039 B2 | 11/2008 | Raymond et al. |
| 7,468,842 B2 | 12/2008 | Steenblik et al. |
| 7,504,147 B2 | 3/2009 | Hannington |
| 7,545,567 B2 | 6/2009 | Tomczyk |
| 7,630,954 B2 | 12/2009 | Adamczyk et al. |
| 7,686,187 B2 | 3/2010 | Pottish et al. |
| 7,712,623 B2 | 5/2010 | Wentz et al. |
| 7,738,175 B2 | 6/2010 | Steenblik et al. |
| 7,751,608 B2 | 7/2010 | Hersch et al. |
| 7,763,179 B2 | 7/2010 | Levy et al. |
| 7,812,935 B2 | 10/2010 | Cowburn et al. |
| 7,830,627 B2 | 11/2010 | Commander et al. |

(56) References Cited

U.S. PATENT DOCUMENTS

| | | | |
|---|---|---|---|
| 7,849,993 | B2 | 12/2010 | Finkenzeller et al. |
| 8,027,093 | B2 | 9/2011 | Commander et al. |
| 8,057,980 | B2 | 11/2011 | Dunn et al. |
| 8,149,511 | B2 | 4/2012 | Kaule et al. |
| 8,528,941 | B2 | 9/2013 | Dörfler et al. |
| 2001/0048968 | A1 | 12/2001 | Cox et al. |
| 2002/0014967 | A1 | 2/2002 | Crane et al. |
| 2002/0185857 | A1 | 12/2002 | Taylor et al. |
| 2003/0031861 | A1 | 2/2003 | Reiter et al. |
| 2003/0112523 | A1 | 6/2003 | Daniell |
| 2003/0179364 | A1 | 9/2003 | Steenblik et al. |
| 2003/0183695 | A1 | 10/2003 | Labrec et al. |
| 2003/0228014 | A1 | 12/2003 | Alasia et al. |
| 2003/0232179 | A1 | 12/2003 | Steenblik et al. |
| 2003/0234294 | A1 | 12/2003 | Uchihiro et al. |
| 2004/0100707 | A1 | 5/2004 | Kay et al. |
| 2004/0140665 | A1 | 7/2004 | Scarbrough et al. |
| 2004/0209049 | A1 | 10/2004 | Bak |
| 2005/0094274 | A1 | 5/2005 | Souparis |
| 2005/0104364 | A1 | 5/2005 | Keller et al. |
| 2005/0161501 | A1 | 7/2005 | Giering et al. |
| 2005/0180020 | A1 | 8/2005 | Steenblik et al. |
| 2006/0017979 | A1 | 1/2006 | Goggins |
| 2006/0018021 | A1 | 1/2006 | Tomkins et al. |
| 2007/0058260 | A1 | 3/2007 | Steenblik et al. |
| 2007/0092680 | A1 | 4/2007 | Chaffins et al. |
| 2007/0183047 | A1 | 8/2007 | Phillips et al. |
| 2007/0273143 | A1 | 11/2007 | Crane et al. |
| 2007/0284546 | A1 | 12/2007 | Ryzi et al. |
| 2007/0291362 | A1 | 12/2007 | Hill et al. |
| 2008/0130018 | A1 | 6/2008 | Steenblik et al. |
| 2008/0160226 | A1 | 7/2008 | Kaule et al. |
| 2008/0182084 | A1 | 7/2008 | Tompkin et al. |
| 2009/0008923 | A1 | 1/2009 | Kaule et al. |
| 2009/0315316 | A1 | 12/2009 | Staub et al. |
| 2010/0018644 | A1 | 1/2010 | Sacks et al. |
| 2010/0068459 | A1 | 3/2010 | Wang et al. |
| 2010/0109317 | A1 | 5/2010 | Hoffmuller et al. |
| 2010/0177094 | A1 | 7/2010 | Kaule et al. |
| 2010/0182221 | A1 | 7/2010 | Kaule et al. |
| 2010/0194532 | A1 | 8/2010 | Kaule |
| 2010/0208036 | A1 | 8/2010 | Kaule |
| 2010/0328922 | A1 | 12/2010 | Peters et al. |
| 2011/0019283 | A1 | 1/2011 | Steenblik et al. |
| 2012/0019607 | A1 | 1/2012 | Dunn et al. |
| 2012/0033305 | A1* | 2/2012 | Moon et al. .................. 359/619 |
| 2013/0010048 | A1 | 1/2013 | Dunn et al. |

FOREIGN PATENT DOCUMENTS

| | | |
|---|---|---|
| DE | 19804858 | 8/1999 |
| DE | 19932240 | 1/2001 |
| EP | 0090130 | 10/1983 |
| EP | 0092691 | 11/1983 |
| EP | 0118222 | 9/1984 |
| EP | 0203752 | 12/1986 |
| EP | 0253089 | 1/1988 |
| EP | 0415230 | 3/1991 |
| EP | 0319157 | 7/1992 |
| EP | 0997750 | 5/2000 |
| EP | 1356952 | 10/2003 |
| EP | 1659449 | 5/2006 |
| EP | 1876028 | 1/2008 |
| EP | 2335937 | 6/2011 |
| FR | 2803939 | 7/2001 |
| GB | 1095286 | 12/1967 |
| GB | 2362493 | 11/2001 |
| JP | 41-004953 | 3/1966 |
| JP | 46-022600 | 8/1971 |
| JP | H04234699 | 8/1992 |
| JP | 11-501590 | 2/1999 |
| JP | 11-189000 | 7/1999 |
| JP | 2000-256994 | 9/2000 |
| JP | 2001-055000 | 2/2001 |
| JP | 2001-324949 | 11/2001 |
| JP | 2003-039583 | 2/2003 |
| JP | 2003-165289 | 6/2003 |
| JP | 2003-528349 | 9/2003 |
| JP | 2004-262144 | 9/2004 |
| KR | 10-0194536 | 6/1999 |
| RU | 2111125 | 5/1998 |
| RU | 2245566 | 1/2005 |
| TW | 575740 | 2/2004 |
| WO | WO 96/35971 | 11/1996 |
| WO | WO 97/19820 | 6/1997 |
| WO | WO 97/44769 | 11/1997 |
| WO | WO 98/13211 | 4/1998 |
| WO | WO 98/15418 | 4/1998 |
| WO | WO 99/26793 | 6/1999 |
| WO | WO 01/07268 | 2/2001 |
| WO | WO 01/11591 | 2/2001 |
| WO | WO 01/39138 | 5/2001 |
| WO | WO 01/63341 | 8/2001 |
| WO | WO 01/71410 | 9/2001 |
| WO | WO 02/40291 | 5/2002 |
| WO | WO 02/43012 | 5/2002 |
| WO | WO 03/005075 | 1/2003 |
| WO | WO 03/007276 | 1/2003 |
| WO | WO 03/022598 | 3/2003 |
| WO | WO 03/061980 | 7/2003 |
| WO | WO 03/061983 | 7/2003 |
| WO | WO 03/082598 | 10/2003 |
| WO | WO 03/098188 | 11/2003 |
| WO | WO 2004/022355 | 3/2004 |
| WO | WO 2004/036507 | 4/2004 |
| WO | WO 2004/087430 | 10/2004 |
| WO | WO 2009/000527 | 12/2008 |
| WO | WO 2009/000528 | 12/2008 |
| WO | WO 2009/000529 | 12/2008 |
| WO | WO 2009/000530 | 12/2008 |
| WO | WO 2009/121784 | 10/2009 |
| WO | WO 2010/015383 | 2/2010 |

OTHER PUBLICATIONS

Leech, Patrick W., et al., Printing via hot embossing of optically variable images in thermoplastic acrylic lacquer, Microelectronic Engineering, 2006, pp. 1961-1965, vol. 83, No. 10, Elsevier Publishers BV, Amsterdam, NL.

Phillips, Roger W., et al., Security Enhancement of Holograms with Interference Coatings, Optical Security and Counterfeit Deterrence Techniques III, 2000, pp. 304-316, SPIE vol. 3973, San Jose, CA.

Steenblik, Richard A., et al., UNISON Micro-optic Security Film, Optical Security and Counterfeit Deterrence Techniques V, 2004, pp. 321-327, SPIE vol. 5310, San Jose, CA.

Van Renesse, Rudolf L., Optical Document Security, 1994, Artech House Inc., Norwood, MA.

Wolpert, Gary R., Design and development of an effective optical variable device based security system incorporating additional synergistic security technologies, Optical Security and Counterfeit Deterrence Techniques III, 2000, pp. 55-61, SPIE vol. 3973, San Jose, CA.

Fletcher, D.A., et al., "Near-field infrared imaging with a microfabricated solid immersion lens", Applied Physics Letters, Oct. 2, 2000, pp. 2109-2111, vol. 77, No. 14.

Hutley, M.C., et al., "The Moiré Magnifier", Pure Appl. Opt. 3, 1994, pp. 133-142, IOP Publishing Ltd., UK.

Hutley, M.C., "Integral Photography, Superlenses and the Moiré Magnifier", European Optical Society, 1993, pp. 72-75, vol. 2, UK.

Hutley, M., et al., "Microlens Arrays", Physics World, Jul. 1991, pp. 27-32.

Kamal, H., et al., "Properties of Moiré Magnifiers", Opt. Eng., Nov. 1998, pp. 3007-3014, vol. 37, No. 11.

Lippmann, G., "Photgraphie—Épreuves Réversibles, Photographies Intégrals", Académie des Sciences, 1908, pp. 446-451, vol. 146, Paris.

Liu, S., et al., "Artistic Effects and Application of Moiré Patterns in Security Holograms", Applied Optics, Aug. 1995, pp. 4700-4702, vol. 34, No. 22.

(56) References Cited

OTHER PUBLICATIONS

Zhang, X., et al., "Concealed Holographic Coding for Security Applications by Using a Moiré Technique", Applied Optics, Nov. 1997, pp. 8096-8097, vol. 36, No. 31.

Hardwick, Bruce and Ghioghiu Ana, "Guardian Substrate as an Optical Medium for Security Devices", Optical Security and Counterfeit Deterrence Techniques III, 2000, pp. 176-179, SPIE vol. 3973, San Jose, CA.

Van Renesse, Rudolf L., Optical Document Security, 1998, 2nd edition, pp. 232-235, 240-241 and 320-321, Artech House Inc., Norwood, MA (ISBN 0-89006-982-4).

Van Renesse, Rudolf L., Optical Document Security, 2005, 3rd edition, pp. 62-169, Artech House Inc., Norwood, MA (ISBN 1-58053-258-6).

Drinkwater, K. John, et al., "Development and applications of Diffractive Optical Security Devices for Banknotes and High Value Documents", Optical Security and Counterfeit Deterrence Techniques III, 2000, pp. 66-79, SPIE vol. 3973, San Jose, CA.

* cited by examiner

LASER MARKED DEVICE

RELATED APPLICATION

This application claims priority to U.S. Provisional Patent Application Ser. No. 61/437,157, filed Jan. 28, 2011, which is incorporated herein in its entirety by reference.

TECHNICAL FIELD

The present invention generally relates to a laser marked device, and more particularly relates to an optical device projecting one or more synthetically magnified images that has been laser marked with one or more static two dimensional (2D) images.

BACKGROUND AND SUMMARY OF THE INVENTION

Micro-optic film materials projecting synthetic images generally comprise (a) a light-transmitting polymeric substrate, (b) an arrangement of micro-sized image icons located on or within the polymeric substrate, and (c) an arrangement of focusing elements (e.g., microlenses). The image icon and focusing element arrangements are configured such that when the arrangement of image icons is viewed through the arrangement of focusing elements, one or more synthetic images are projected. These projected images may show a number of different optical effects. Material constructions capable of presenting such effects are described in U.S. Pat. No. 7,333,268 to Steenblik et al., U.S. Pat. No. 7,468,842 to Steenblik et al., U.S. Pat. No. 7,738,175 to Steenblik et al., U.S. Pat. No. 7,830,627 to Commander et al., U.S. Patent Application Publication No. 2009/0008923 to Kaule et al.; U.S. Patent Application Publication No. 2010/0177094 to Kaule et al.; U.S. Patent Application Publication No. 2010/0182221 to Kaule et al.; European Patent Application No. 08784548.3 (or European Publication No. 2162294) to Kaule et al.; and European Patent Application No. 08759342.2 (or European Publication No. 2164713) to Kaule.

These film materials may be used as security devices for authentication of banknotes, secure documents and products. For banknotes and secure documents, these materials are typically used in the form of a strip or thread and either partially embedded within the banknote or document, or applied to a surface thereof. For passports or other identification (ID) documents, these materials could be used as a full laminate or embedded as an anti-counterfeit feature in polycarbonate passports.

Secure documents made up of fused multilayer polymer film materials have become increasingly popular in recent years. Common forms of these secure documents include passport data pages and ID cards in which multiple layers of polycarbonate, polyethylene terephthalate (PET), glycol-modified polyethylene terephthalate (PETG), and other thermoplastic polymers have been fused together to form a secure, indivisible structure. Such products are often formed from a number of layers of a single type of polymer, such as polycarbonate, with some of the layers containing different polycarbonate compositions. Some of the different layer compositions include opaque layers and clear layers. The clear layers may either contain or be free of laser markable materials.

An object of the present invention is to increase the complexity and thus the counterfeit-resistance of these secure documents by incorporating laser markable or laser marked optical (e.g., micro-optic) film materials. The static 2D images laser marked on, within, or below these film materials help determine the authenticity of the documents (e.g., documents having financial value, identity documents, non-secure documents) and products that employ them. The inventive materials may also be used simply for brand enhancement purposes (e.g., as (or as part of) a product label) with the laser marked 2D image providing, for example, a company logo or other brand identifier.

Laser personalization is widely used as a means to add customized personalization data to secure documents at the point of issue. This personalization feature further protects a secure document being issued by a government or corporate entity by allowing the issuer to personalize the document with the intended recipient's personal information. By way of the present invention, this type of personalization feature has been incorporated onto, into, or below an optical film material suitable for use with secure documents thereby enhancing the security features of these documents. In the past, micro-optic systems capable of presenting synthetic images did not contain laser markable substrate materials. Also, to this point in time, laser markable products have not contained micro-optic systems capable of presenting synthetic images.

Laser marking micro-optic film materials has in the past been deemed impracticable (i.e., not capable of being put into practice) due to the risk of causing permanent damage to these materials. As is known to those skilled in the art, laser writing causes overheating and swelling of these film materials, which results in bubbling, separation, or delamination at interfaces within the structure, and/or permanent damage to the microlenses and/or micro-sized image icons, thus causing permanent distortion of the synthetic images.

The present inventors have developed a method for laser marking a device that embodies or comprises an optical film material without physically damaging the material or distorting the image(s) projected by the material.

In particular, the present invention provides a method for laser marking one or more static 2D images on or within a device that embodies or comprises an optical film material that projects at least one synthetically magnified image, the method comprising:

identifying one or more layers or interfaces within the optical film material that may be damaged by laser energy, or by heat and gas generated by laser absorption within a laser receptive layer (hereinafter referred to as "laser sensitive layer or interface");

either positioning one or more layers markable by laser energy above the laser sensitive layer or interface (hereinafter referred to as "laser markable layer"), positioning one or more thermal spacer layers and one or more laser markable layers below the optical film material, the thermal spacer layer(s) being located between the optical film material and the one or more laser markable layers, modifying the laser sensitive interface to increase the bond strength and/or thermal resistance of the interface, or replacing the laser sensitive layer with a layer made from a material with a higher bond strength and/or a higher thermal resistance;

optionally, molding the layers together using heat and pressure to form a device that embodies the optical film material (e.g., a card or composite structure); and exposing the device to laser energy so as to mark one or more static 2D images on or into the one or more laser markable layers.

The term "above", as used herein, is intended to mean a layer that is closer to a source of laser energy than another layer in the inventive device, while the term "below", as used herein, is intended to mean a layer that is farther from the laser energy source than another layer in the inventive device.

The term "laser markable" or any variant thereof, as used herein, is intended to mean capable of physical or chemical modification induced or formed by a laser including, but not limited to, carbonizing, engraving, engraving with or without color change, engraving with surface carbonization, color change or internal blackening, laser marking by coating removal, ablation, bleaching, melting, swelling, and vaporization, and the like. The term "laser marked" or any variant thereof, as used herein, is intended to mean carrying or displaying any mark formed by a laser or laser-like device.

The present invention also provides a laser markable optical device, which comprises:

an optical film material that comprises one or more optionally encapsulated arrangements of focusing elements and one or more arrangements of image icons disposed on opposing sides of an optical spacer layer, at least a portion of the focusing elements forming at least one synthetically magnified image of at least a portion of the image icons; and optionally, one or more layers located above and/or below the optical film material, wherein at least one arrangement or layer within or layer above or below the optical film material is markable by laser energy, and wherein static 2D images may be laser marked on or into the laser markable arrangement(s) or layer(s) without damaging the focusing elements or the image icons of the optical film material, and without causing bubbling, separation, or delamination at any interface within the device.

In a first exemplary embodiment, the optical film material of the laser markable optical device has one or more layers located above and/or below the film material (hereinafter the inventive device in which the optical film material has layers located above and also below the film material is sometimes referred to as a "composite security structure").

In one such embodiment, the laser markable device is made up of an optical film material that comprises an arrangement of encapsulated refractive focusing elements and an arrangement of image icons that are separated by an optical spacer layer, and one or more layers located above or above and below the optical film material, wherein one or more arrangements or layers located above the arrangement of image icons is a laser markable arrangement or layer.

In another such embodiment, the arrangement(s) of focusing elements is an arrangement of reflective focusing elements and one or more arrangements or layers located above the arrangement of reflective focusing elements is a laser markable arrangement or layer.

In yet another such embodiment, the laser markable device is made up of an optical film material, one or more underlying laser markable layers, and one or more thermal spacer layers positioned between the optical film material and the one or more underlying laser markable layers. In this embodiment, laser marking takes place through the optical film material.

In yet a further such embodiment, the laser markable device is made up of an optical film material that comprises an arrangement of focusing elements embedded within an adhesive material, one or more underlying laser markable layers, and an adhesive layer positioned between the optical film material and the one or more underlying laser markable layers. In this embodiment, laser marking takes place through the optical film material.

In a second exemplary embodiment, the optical film material of the laser markable optical device is a stand-alone film material that is not covered or embedded.

In exemplary "stand alone" embodiments, the laser markable device is made up of an optical film material that comprises an arrangement of refractive or reflective focusing elements and an arrangement of image icons that are separated by a laser markable layer that also functions as an optical spacer.

The present invention further provides a laser marked optical device that basically comprises an optical film material as described above, and optionally one or more layers located above and/or below the optical film material, wherein at least one arrangement or layer of the optical film material or at least one layer above or below the optical film material is a laser markable arrangement or layer, and wherein the laser markable arrangement(s) or layer(s) has one or more laser marked static 2D images thereon.

The present invention also provides sheet materials and base platforms that are made from or employ the inventive laser markable or laser marked optical device, as well as documents made from these materials. The term "documents", as used herein designates documents of any kind having financial value, such as banknotes or currency, and the like, or identity documents, such as passports, ID cards, driving licenses, and the like, or other documents, such as tags and labels. The inventive optical system is also contemplated for use with consumer goods as well as bags or packaging used with consumer goods, such as potato chip bags.

Other features and advantages of the invention will be apparent to one of ordinary skill from the following detailed description and accompanying drawings.

Unless otherwise defined, all technical and scientific terms used herein have the same meaning as commonly understood by one of ordinary skill in the art to which this invention belongs. All publications, patent applications, patents and other references mentioned herein are incorporated by reference in their entirety. In case of conflict, the present specification, including definitions, will control. In addition, the materials, methods, and examples are illustrative only and not intended to be limiting.

BRIEF DESCRIPTION OF THE DRAWINGS

The present disclosure may be better understood with reference to the following drawings. Matching reference numerals designate corresponding parts throughout the drawings, and components in the drawings are not necessarily to scale, emphasis instead being placed upon clearly illustrating the principles of the present disclosure. While exemplary embodiments are disclosed in connection with the drawings, there is no intent to limit the present disclosure to the embodiment or embodiments disclosed herein. On the contrary, the intent is to cover all alternatives, modifications and equivalents.

Particular features of the disclosed invention are illustrated by reference to the accompanying drawings in which.

DETAILED DESCRIPTION OF THE INVENTION

Figure 1:
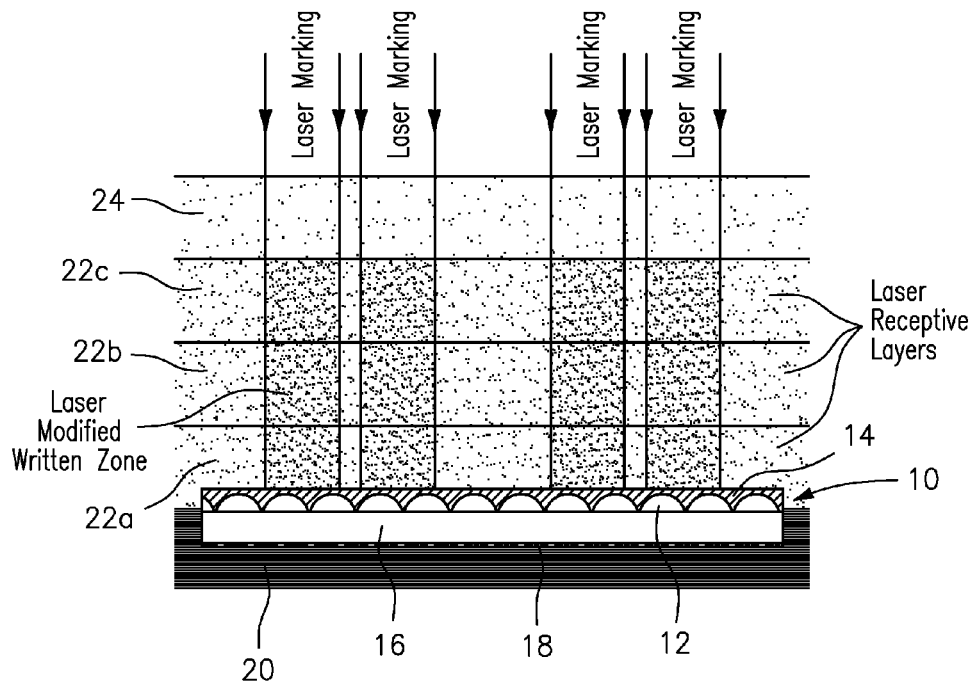
FIG. 1 is a cross-sectional side view of an exemplary embodiment of the laser markable device of the present invention in the form of a composite security structure, where the optical film material employs an arrangement of encapsulated refractive focusing elements.

By way of the present invention, the complexity and thus the counterfeit-resistance of known optical (e.g., micro-optic) film materials, as well as documents that employ these materials, are increased. In addition, several embodiments of the inventive device described herein offer increased resistance to tampering or alteration and wear. While embodiments described herein have one or more laser markable layers positioned above, within, or below the optical film material, the invention is not so limited. The present invention also contemplates a device in which laser markable layers are positioned on both sides of the optical film material, possibly in combination with clear or laser receptive windows positioned over the film material in the composite security structure.

As noted above, the laser markable device of the present invention basically comprises: an optical film material for projecting at least one synthetically magnified image that comprises one or more optionally encapsulated arrangements of focusing elements and one or more arrangements of image icons that are disposed on opposing sides of an optical spacer layer; and optionally, one or more layers located above and/or below the optical film material, wherein at least one arrangement or layer within or layer above or below the optical film material is a laser markable arrangement or layer. Hereinafter, use of the terms "a" and "an" and "the" and similar referents in the context of describing the invention are to be construed to cover both the singular and the plural, unless otherwise indicated herein or clearly contradicted by context. The term "layer" will equally relate to both arrangements and layers located above, below, or within the optical film material.

The static 2D images (e.g., letters, numbers, symbols, pictures, digital photographs, designs or machine readable information) are laser marked on or into the laser markable layers of the laser markable device. The inventive device is designed to enable a laser to visibly alter the laser markable layers without damaging the focusing elements or the image icons of the optical film material, and without causing bubbling, separation, or delamination at any interface within the device.

The location of the laser markable layer(s) will determine which layer or interface constitutes a vulnerable or sensitive layer that needs to be protected against damage caused by exposure to laser energy. Because heat and gas are generated as the laser markable layer(s) absorbs laser radiation, the layers and interfaces closest to this laser markable layer(s) are susceptible to damage (e.g., bubbling, separation, or delamination).

In the case where it is desirable to mark into laser markable layers located above the optical film material, the optical film material and interface above the optical film material are susceptible to damage that results as the laser markable layer(s) absorbs laser energy and darkens, thereby generating heat and gas due to the absorption of laser energy, while in the case where it is desirable to mark into laser markable layers located below the optical film material, the optical film material and interface below the optical film material are particularly vulnerable to damage.

In the case where the focusing elements are reflective focusing elements; the arrangement of reflective focusing elements constitutes the vulnerable or sensitive layer due to the opacity of the reflective material.

To protect the sensitive layers and interfaces against damage caused by exposure to laser energy and the byproducts of laser absorption in the laser markable layer(s), the relative position of the laser markable layers within the inventive device are considered, the concentration of laser energy absorbing ingredients within these layers, interfacial bond strengths, and the laser light intensity used during laser marking are selected, and in some exemplary embodiments thermal spacer layers are employed, so that enough laser energy is absorbed within the laser markable layers to mark these layers while avoiding damage to the sensitive layer or interface. In other exemplary embodiments, the laser sensitive interface is modified to increase the bond strength and/or thermal resistance of the interface, or the laser sensitive layer is replaced with a layer made from a material with a higher bond strength and/or higher thermal resistance. By way of example, the laser sensitive interface may be modified by employing at the interface an adhesive film, a solvent welding primer composition or a two part epoxy that forms a strong interfacial bond, or a thermoplastic material that will form a bond during the optional molding step of the inventive method.

Suitable laser markable layers may be prepared using thermoplastic polymers. In a first category, thermoplastic polymers with good absorption and carbonization may be used. These polymers are laser markable in the absence of so-called laser additives, which are compounds absorbing light at the wavelength of the laser used, and converting it to heat. Examples of these polymers, which produce extensive blackening in the area exposed to the laser, include polyethersulfone (PES), polysulfone (PSU), polycarbonate (PC), and polyphenylene sulfide (PPS). In a second category, thermoplastic polymers with laser additives (e.g., pigments or special additives) may be used. Examples of these polymers, which can be marked uniformly and with good quality, include polystyrene (PS), styrene acrylonitrile (SAN), acrylonitrile butadiene styrene (ABS), PET, PETG, polybutylene terephthalate (PBT) and polyethylene. Examples of these laser additives include carbon black, antimony metal, antimony oxide, tin-antimony mixed oxides, phosphorous-containing mixed oxides of iron, copper, tin and/or antimony, mica (sheet silicate) coated with metal oxides. The laser markable layers have preferred thicknesses ranging from about 5 to about 500 microns, more preferably from about 25 to about 200 microns. In a preferred embodiment in which the optical film material is covered or forms part of the composite security structure, the laser markable layers of the inventive laser markable device are laser markable transparent polycarbonate films (thickness ranging from about 5 to about 500 microns) that are available from SABIC Innovative Plastics, One Plastics Ave., Pittsfield, Mass. 01201 ("SABIC") under the product designation Lexan SD8B94 film. In a preferred embodiment for the "stand alone" embodiment in which the optical film material is not covered or embedded, the laser markable optical spacer is a clear polycarbonate sheet (thickness ranging from about 5 to about 500 microns) that is available from 3M, 3M Center, St. Paul, Minn. 55144-100 ("3M") under the product designation Clear LE clear polycarbonate film.

These exemplary embodiments of the inventive laser markable device are marked using any suitable laser such as a pulsed Nd:YAG, Nd:YO$_4$, or FAYb laser, typically having 1064, 532, or 355 nanometer (nm) laser wavelengths, galvanometer mounted mirrors, and a scan lens to enable marking over a two dimensional field. Any laser with wavelengths within this range (as well as higher and lower wavelengths) and various control mechanisms may be used for this purpose. Other examples of suitable lasers include $CO_2$, Excimer, or doubled Nd:YAG lasers. The inventive device is irradiated with a focused laser beam at given locations and pulse energies. The area irradiated by the laser absorbs the laser energy and produces heat, resulting in carbonization which causes a visible discoloration or darkening in the laser markable arrangement(s) or layer(s). The visible discoloration serves as a "mark", and usually appears in a color ranging from shades of gray to opaque black.

In a preferred laser marking technique, a V-Lase 10 Watt Q-switched 1064 nanometer (nm) laser marking system is used to mark the inventive laser markable device, the laser marking system producing laser light emission at a setting of 30,000 Hertz (Hz). The laser marking system is set to 80% of maximum power, and a scan speed of 200 millimeters per second (mm/sec). These settings produce a high contrast mark in the desired location within the inventive laser markable device without burning or overexposure. The device to be laser marked is placed beneath the laser scanning head of the laser marking system by an automatic loading mechanism or by hand placement. Next, the laser is controlled by a computer using a data file containing the marking pattern. A low power aiming beam is optionally used before the marking step to verify the correct placement of the device. When a command is received by the laser marking system, the focused laser will scan the areas to be marked with a pulsed laser output, with scan speeds, pulse frequencies, and output power being modulated according to the controlling data file. These are input variables that are adjusted according to device type, thickness, and desired aesthetics of the mark(s) being written. By making adjustments to these variables, lighter or darker marks may be made. Settings are optimized for particular materials and marks, with all setting adjustments monitored to avoid over-darkening, swelling, or burning the device.

As explained above, the optical film material of the laser markable optical device of the present invention may or may not be covered or embedded.

In one such exemplary embodiment, the laser markable device is made up of an optical film material that comprises an arrangement of encapsulated refractive focusing elements and an arrangement of image icons that are separated by an optical spacer, and one or more layers located above and/or below the optical film material. In one such embodiment, the one or more layers located above the arrangement of image icons are laser receptive layers, with an outermost layer being a transparent thermoplastic material layer. The outermost transparent thermoplastic material layer provides the inventive device with increased resistance to tampering or alteration and wear.

The optical film material in this exemplary embodiment may be prepared in accordance with the teachings of U.S. Pat. No. 7,333,268 to Steenblik et al., U.S. Pat. No. 7,468,842 to Steenblik et al., and U.S. Pat. No. 7,738,175 to Steenblik et al., all of which are fully incorporated herein by reference as if fully set forth herein. As described in these references, arrays of focusing elements and image icons can be formed from a variety of materials such as substantially transparent or clear, colored or colorless polymers such as acrylics, acrylated polyesters, acrylated urethanes, epoxies, polycarbonates, polypropylenes, polyesters, urethanes, and the like, using a multiplicity of methods that are known in the art of micro-optic and microstructure replication, including extrusion (e.g., extrusion embossing, soft embossing), radiation cured casting, and injection molding, reaction injection molding, and reaction casting. High refractive index, colored or colorless materials having refractive indices (at 589 nm, 20° C.) of more than 1.5, 1.6, 1.7, or higher, such as those described in U.S. Patent Application Publication No. US 2010/0109317 A1 to Hoffmuller et al., may also be used in the practice of the present invention.

An exemplary method of manufacture for the optical film material is to form the icons as voids in a radiation cured liquid polymer (e.g., acrylated urethane) that is cast against a base film (i.e., an optical spacer), such as 75 gauge adhesion-promoted polyethylene terephthalate (PET) film, then to form the focusing elements as lenses from the radiation cured polymer on the opposite face of the base film in correct alignment or skew with respect to the icons, then to fill the icon voids with a submicron particle pigmented coloring material by gravure-like doctor blading against the film surface, and solidify the fill by suitable means (e.g., solvent removal, radiation curing, or chemical reaction).

The refractive focusing elements of the optical film material are encapsulated using a material having a refractive index that is substantially or measurably different than the refractive index of the material used to form the focusing elements. In particular, the difference in these refractive indices causes the focal length of the focusing elements to converge on the arrangement(s) of image icons.

The encapsulating material may be transparent, translucent, tinted, or pigmented and may provide additional functionality for security and authentication purposes, including support of automated currency authentication, verification, tracking, counting and detection systems, that rely on optical effects, electrical conductivity or electrical capacitance, magnetic field detection. Suitable materials can include adhesives, gels, glues, lacquers, liquids, molded polymers, and polymers or other materials containing organic or metallic dispersions, provided the refraction of light is not completely disrupted.

The encapsulating material is applied to the focusing element arrangement(s) by transparent printing, molding, sol-gel (chemical solution deposition), curtain coating or blading, flood coating and open air drying/curing, coating and ultraviolet (UV)/energy curing against a smooth cylinder, laminating with adhesive backed film, anilox or metering roller, evaporation, chemical vapor deposition (CVD), physical vapor deposition (PVD), or any other means of applying a substance to a surface, including those described in U.S. Pat. No. 7,333,268 to Steenblik et al., U.S. Pat. No. 7,468,842 to Steenblik et al., and U.S. Pat. No. 7,738,175 to Steenblik et al., all of which, as noted above, are fully incorporated herein by reference as if fully set forth herein.

The optical film material of this exemplary embodiment may further comprise additional features, such as those described in U.S. Pat. No. 7,333,268 to Steenblik et al., U.S. Pat. No. 7,468,842 to Steenblik et al., U.S. Pat. No. 7,738,175 to Steenblik et al., and U.S. Patent Application Publication No. 2007/0273143 to Crane et al. By way of example, enhanced optically variable effects may be formed by combining or registering the synthetically magnified images generated by the optical film materials with the static 2D images, such as those effects described in U.S. Patent Application Publication No. 2007/0273143 to Crane et al.

In another exemplary embodiment, the arrangement(s) of focusing elements of the inventive laser markable optical device is an arrangement of reflective focusing elements and one or more layers located above the arrangement of reflective focusing elements is a laser markable layer, with the layer located immediately above the optical film material optionally being a transparent thermoplastic material layer. The reflective focusing elements may be made reflective by metallization or by coating with a high refractive index nonmetallic material, such as zinc sulphide (ZnS) or indium tin oxide (ITO).

The optical system of this exemplary embodiment may also be prepared using materials and fabrication techniques described in U.S. Pat. No. 7,333,268 to Steenblik et al., U.S. Pat. No. 7,468,842 to Steenblik et al., and U.S. Pat. No. 7,738,175 to Steenblik et al., and may also contain additional features as described in these references as well as in U.S. Patent Application Publication No. 2007/0273143 to Crane et al.

The transparent thermoplastic material layer located above the optical film material in each of these embodiments is added to achieve a desired thickness of the composite device for structural or other functional reasons, and may be positioned at various locations in the composite device. If positioned as an outermost layer, it also serves the purpose of providing the inventive device with increased resistance to tampering or alteration and wear. This optional layer may be prepared from materials such as acrylonitrile butadiene styrenes, ethylene vinyl acetates, polyacrylates, polyamides, polycarbonates, polyesters, polyethylenes, polyethylene napthalates, polyethylene terephthalates, polymethyl methacrylates, polypropylenes, polystyrenes, polysulfones, polyurethanes, polyvinyl acetates, polyvinylidene chlorides, and the like. The transparent thermoplastic material layer has a thickness ranging from about 5 to about 500 microns, preferably from about 25 to about 150 microns, which includes ranges of from about 50 to about 120 microns, and from about 80 to about 100 microns. In a preferred embodiment, the transparent thermoplastic material layer is a clear polycarbonate film that is available from SABIC under the product designation Lexan SD8B14 film.

The opaque or transparent thermoplastic or thermosetting material layer optionally located below the optical film material as a base or support layer may be prepared from materials such as acrylonitrile butadiene styrenes, ethylene vinyl acetates, polyacrylates, polyamides, polycarbonates, polyesters, polyethylenes, polyethylene napthalates, polyethylene terephthalates, polymethyl methacrylates, polypropylenes, polystyrenes, polysulfones, polyurethanes, polyvinyl acetates, polyvinylidene chlorides, and the like. The opaque or transparent base layer, which may contain organic or inorganic additives or fillers for opacity, has a preferred thickness ranging from about 5 to about 500 microns, more preferably from about 25 to about 150 microns. In a preferred embodiment, this optional layer is an opaque white polycarbonate film from SABIC with the product designation Lexan SD8B24 film.

In yet another exemplary embodiment, the inventive laser markable device is made up of an optical film material, one or more underlying laser markable layers, and one or more thermal spacer layers positioned between the optical film material and the underlying laser markable layer(s). In this exemplary embodiment, laser marking takes place through the optical film material.

The thermal spacer layer serves the purpose of isolating the optical film material from the heat generated during the laser marking process. This layer(s) may be prepared from materials such as acrylics, acrylonitrile butadiene styrenes, ethylene vinyl acetates, polyacrylates, polyamides, polycarbonates, polyesters, polyethylenes, polyethylene napthalates, polyethylene terephthalates, polymethyl methacrylates, polypropylenes, polystyrenes, polysulfones, polyurethanes, polyvinyl acetates, polyvinylidene chlorides, and the like, in the form of an adhesive (e.g., clear acrylic thermoplastic adhesive) or sheet material (e.g., clear thermoplastic sheet material), that are transparent to laser marking radiation and do not contain laser marking additives. The thermal spacer layer has a thickness ranging from about 5 to about 500 microns, preferably from about 25 to about 150 microns. Thermal spacer layers having thicknesses falling outside of the broader range noted above will either be too thin to thermally isolate the optical film material, or too thick to be practical in an ID card or secure document. In a preferred embodiment, the thermal spacer layer is a clear polycarbonate film, which is available from SABIC under the product designation Lexan SD8B14.

It is noted that the layers located above and/or below the optical film material may include other features, such as windows, additional optically variable devices, RFID chips, and various other features used in polymer security devices.

In exemplary "stand alone" embodiments, the laser markable device is made up of an optical film material that comprises an arrangement of refractive or reflective focusing elements and an arrangement of image icons that are separated by a laser markable layer that also functions as an optical spacer.

The same general rules described above also apply to these embodiments. In particular, in the case where the focusing elements are refractive focusing elements, the laser markable layer (i.e., the laser markable optical spacer) is positioned above the arrangement of image icons, while in the case where the focusing elements are reflective focusing elements, the laser markable layer (i.e., the laser markable optical spacer) lies above the arrangement of reflective focusing elements.

The optical film material of the inventive device may be prepared as described above with the exception that the optical spacer is now laser markable and with the further exception that when the focusing elements are refractive focusing elements, the focusing elements may either be open to the air or they may be encapsulated in a polymer. The optical film material of the inventive device may also contain additional features as described in the listed references.

Images are marked in the laser receptive layer(s) of the inventive device using a laser marking system set at a power level that provides a dark, legible mark. The power level is specific to the maximum output power of the laser marking system and its wavelength of operation, in addition to the frequency, scan speed and focused laser spot size. Settings that are not suitable are those that leave an illegible mark that is either too light to read or too bold, causing damage in the area of the mark.

Referring now to the drawings in detail, several of the exemplary embodiments described above that have been prepared and laser marked are depicted. The following description of these embodiments is not intended to be exhaustive or to limit the invention to the precise forms depicted therein.

Example 1

In this example, which is shown in FIG. 1, an optical film material 10 containing refractive lenses 12 encapsulated below a layer of a thermoset polymer 14, an optical spacer 16, and image icons 18 was prepared and then embedded between a 150 micron thick base layer 20 prepared using an opaque white polycarbonate film from SABIC with the product designation Lexan SD8B24 film, and a multi-layer construction made up of three laser markable layers 22a, 22b, 22c of 150 micron thick laser markable transparent polycarbonate film from SABIC with the product designation Lexan SD8B94 film, and a 150 micron thick outerlayer 24 prepared using a clear polycarbonate film from SABIC with the product designation Lexan SD8B14 film.

An image was then marked in the laser markable transparent polycarbonate film layers 22a, 22b, 22c using a V-Lase 10 Watt Q-switched 1064 nm laser marking system, which produced laser light emission at 30,000 Hz with a power setting of 80%, and scan speed of 200 mm/sec. The resulting material or device contained the laser marked image with no detectable damage to the optical film material or internal interfaces.

Example 2

Figure 2:
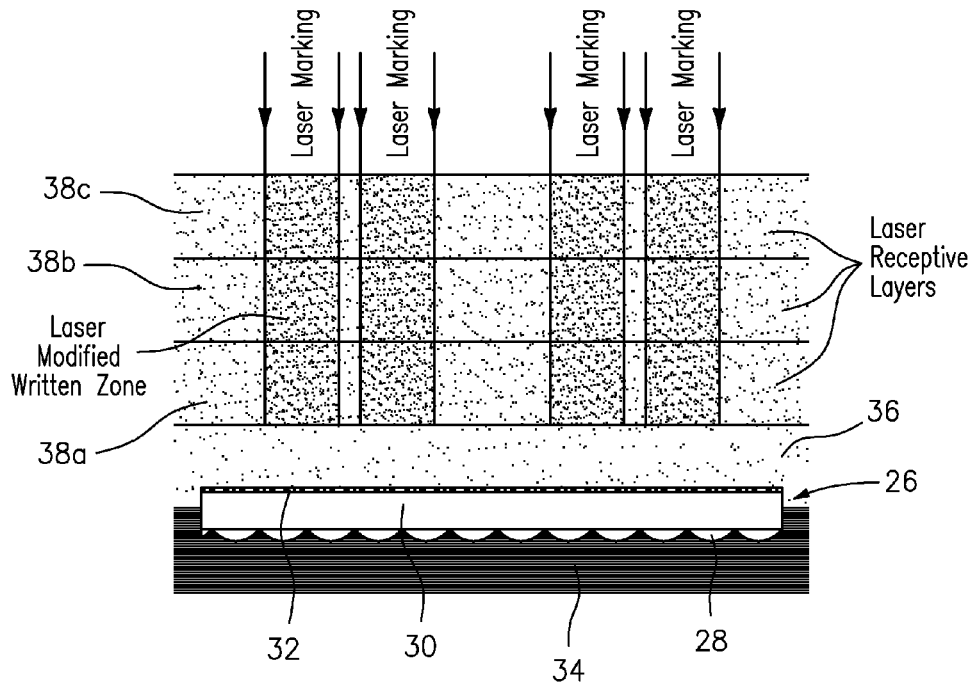
FIG. 2 is a cross-sectional side view of another exemplary embodiment of the laser markable device of the present invention also in the form of a composite security structure, where the optical film material employs an arrangement of reflective focusing elements.

In this example, which is shown in FIG. 2, an optical film material 26 containing metalized reflective lenses 28, an optical spacer 30, and image icons 32 was prepared and then embedded between a 150 micron thick Lexan SD8B24 opaque white polycarbonate film base layer 34, and a multi-layer construction made up of a 150 micron thick Lexan SD8B14 clear polycarbonate innerlayer 36, and three 150 micron thick Lexan SD8B94 laser markable transparent polycarbonate film overlayers 38a, 38b, 38c.

An image was then marked in the laser markable transparent polycarbonate film layers 38a, 38b, 38c using the same laser marking system and settings as set forth above in Example 1. The resulting material or device again contained the laser marked image with no detectable damage to the optical film material or internal interfaces.

Example 3

Figure 3:
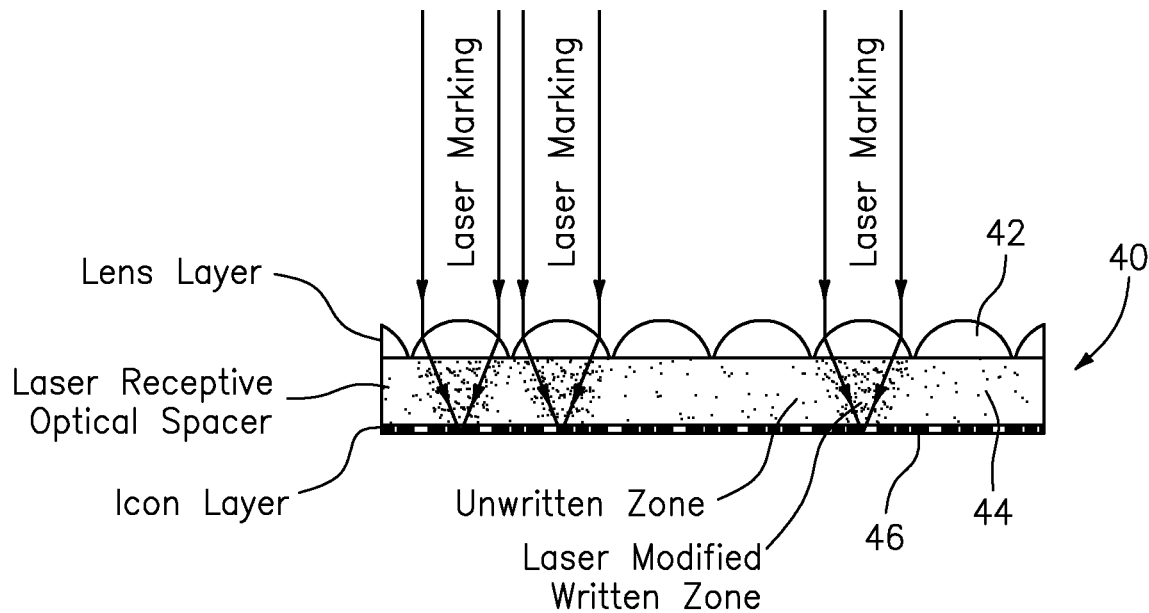
FIG. 3 is a cross-sectional side view of an exemplary "stand alone" embodiment of the laser markable device of the present invention, where the optical film material comprises an arrangement of refractive focusing elements and an arrangement of image icons that are separated by a laser markable optical spacer layer.

In this example, which is shown in FIG. 3, an optical film material 40 containing refractive lenses 42, a laser markable optical spacer 44, and image icons 46 was prepared. The laser markable optical spacer 44 was a 50 micron thick, clear polycarbonate sheet from 3M, 3M Center, St. Paul, Minn. 55144-100 ("3M") under the product designation Clear LE clear polycarbonate film. An array of refractive lenses 42 with a 58 micron focal length were formed on an uppermost surface of the optical spacer 44, and a 3 micron thick arrangement or layer of pigmented image icons 46 was formed on the lowermost surface of the optical spacer 44. The prepared micro-optic film material projected synthetically magnified images with sharp focus.

An image was marked in the optical spacer 44 using the same laser marking system and settings as set forth above in Example 1. The resulting material or device contained the laser marked image with no detectable damage to the refractive lenses 42. In this example, the lenses were transparent enough to the 1064 nm laser light to allow transmission of the laser into the laser markable optical spacer 44 without damaging the lenses 42, or introducing significant swelling or distortion of the synthetic images, yet producing indelible marking or darkening within the structure.

Example 4

Figure 4:
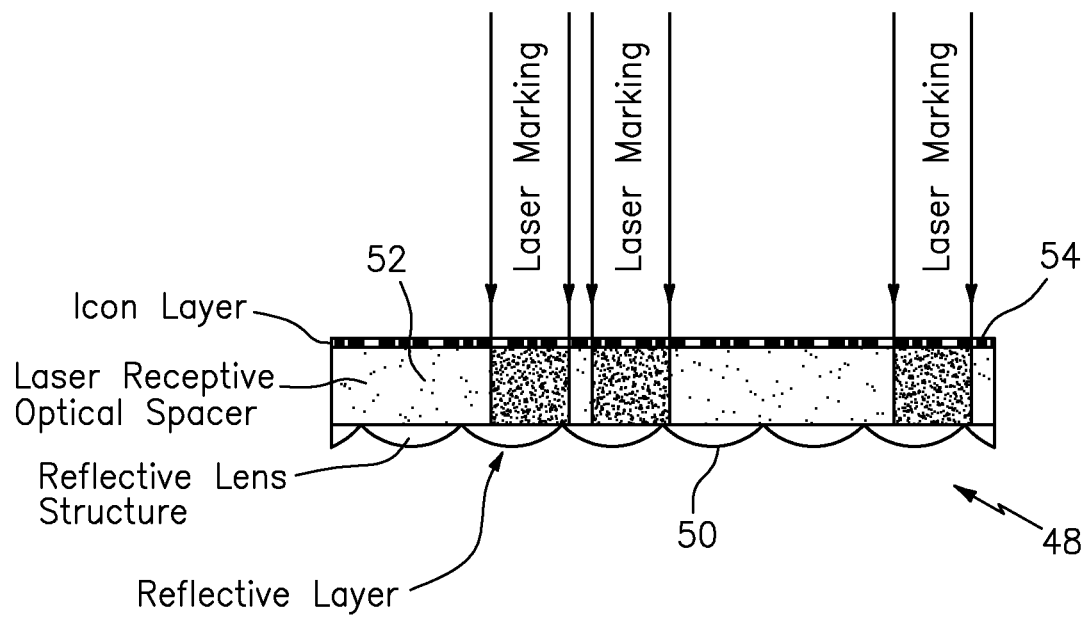
FIG. 4 is a cross-sectional side view of another exemplary "stand alone" embodiment of the laser markable device of the present invention, where the optical film material comprises an arrangement of reflective focusing elements and an arrangement of image icons that are separated by a laser markable optical spacer layer.

In this example, which is shown in FIG. 4, an optical film material 48 containing reflective lenses 50, a laser markable optical spacer 52, and image icons 54 was prepared. The laser markable optical spacer 52 was a 50 micron thick, clear polycarbonate sheet from 3M, 3M Center, St. Paul, Minn. 55144-100 ("3M") under the product designation Clear LE clear polycarbonate film. An array of reflective lenses 50 with a 52 micron focal length were formed on the lowermost surface of the optical spacer 52, and a 3 micron thick arrangement or layer of pigmented image icons 54 was formed on the uppermost surface of the optical spacer 52. The prepared micro-optic film material projected synthetically magnified images with sharp focus.

An image was marked in the optical spacer 52 using the same laser marking system and settings as set forth above in Example 1. The resulting material or device contained the laser marked image with no detectable damage to the reflective lenses 50. In this example, the image icons were transparent enough to the 1064 nm laser light to allow transmission of the laser into the laser markable optical spacer 52 without damaging the image icons 54, or introducing significant swelling or distortion of the synthetic images, yet producing indelible marking or darkening within the structure.

Example 5

Figure 5:
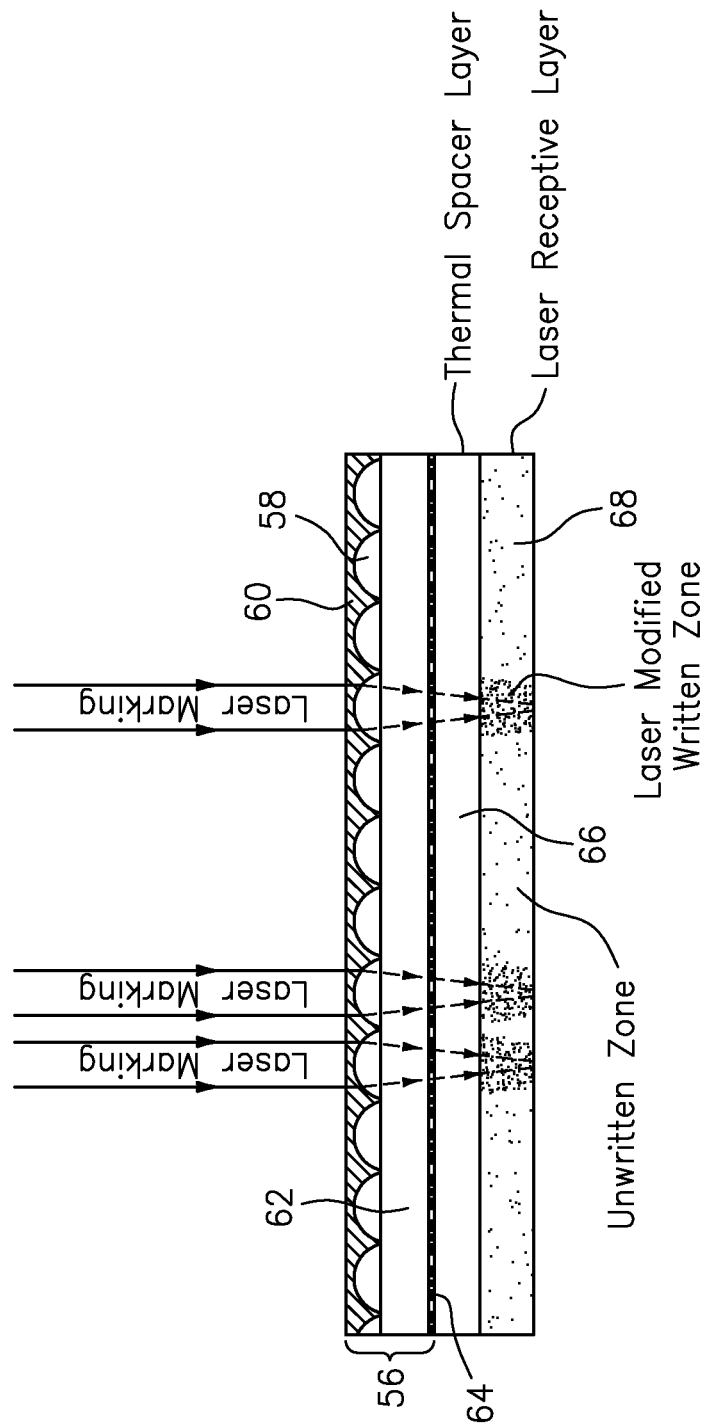
FIG. 5 is a cross-sectional side view of yet another exemplary embodiment of the inventive laser markable device, which is made up of an optical film material, an underlying laser markable layer, and a thermal spacer layer positioned between the optical film material and the underlying laser markable layer.

In this example, which is shown in FIG. 5, an optical film material 56 containing refractive lenses 58 encapsulated below a layer of a thermoset polymer 60, an optical spacer 62, and image icons 64 was prepared. A thermal spacer layer 66 in the form of a clear polycarbonate film from SABIC with the product designation SD8B14, having a thickness of 150 microns, was then applied to the underside of the optical film material 56 using acrylic thermoplastic adhesive. A 150 micron thick laser markable transparent polycarbonate film 68 from SABIC with the product designation Lexan SD8B94 film was then applied to the underside of the thermal spacer layer 66.

An image was marked in the laser markable film 68 using a V-Lase 10 Watt Q-switched 1064 nm laser marking system at the following settings: 30,000 Hz, 80% power, and scan speed of 200 mm/sec. The resulting material or device contained the laser marked image with no detectable damage to the optical film material 56, or delamination between layers of the device.

Example 6

Figure 6:
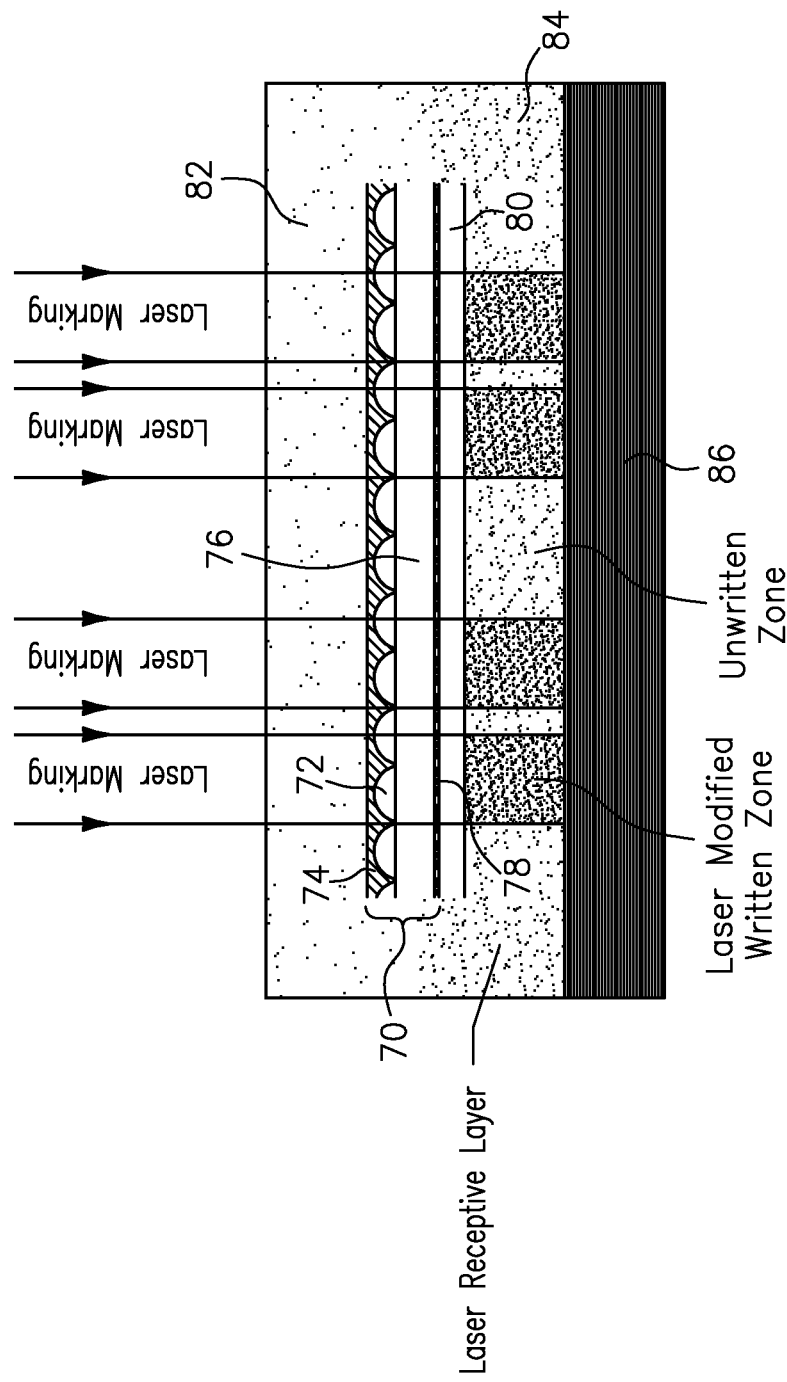
FIG. 6 is a cross-sectional side view of a further exemplary embodiment of the inventive laser markable device, which is made up of an optical film material with adhesive embedded focusing elements, an underlying laser markable layer and opaque white layer, and an adhesive layer positioned between the optical film material and the underlying laser markable layer.

In this example, which is shown in FIG. 6, an optical film material 70 containing refractive lenses 72 encapsulated below a layer of acrylic thermoplastic adhesive 74, an optical spacer 76, and image icons 78 was prepared. The optical film material 70 was backcoated with a 5 micron thick layer of acrylic adhesive 80 and then die cut into a 19 mm (0.75 inch) diameter circle. Above the die cut optical film material 70 was placed a layer of 150 micron thick clear polycarbonate film 82 from SABIC under the product designation Lexan SD8B14 film. A 150 micron thick laser markable transparent polycarbonate film 84 from SABIC with the product designation Lexan SD8B94 film was then applied to the adhesive coated underside of the optical film material 70, followed by a 150 micron thick layer of opaque white polycarbonate film 86 from SABIC with the product designation Lexan SD8B24 film. This construction was trimmed to a size of 89 mm×127 mm, placed into a heated platen press and the layers molded together at a temperature of 177° C. (350° F.) and a pressure of 15.8 megapascals (2,286 psi) for a period of 10 minutes. The result was a composite card having a patch of optical film material 70 molded therein.

An image was marked in the laser markable film 84 using a V-Lase 10 Watt Q-switched 1064 nm laser marking system at the following settings: 30,000 Hz, a scan speed of 200 mm/sec, and a power setting of 50%. The resulting composite card contained the laser marked image with no detectable damage to the optical film material 70, or delamination between layers of the card.

The inventive laser markable and laser marked device may be used in the form of, for example, a sheet material for use in making, for example, banknotes, passports, and the like, or it may adopt a thicker, more robust form for use as, for example, a base platform for an ID card, high value or other security document. The inventive device may also be used in the form of a security strip, thread, patch, or overlay and mounted to a surface of, or at least partially embedded within a fibrous or non-fibrous sheet material (e.g., banknote, passport, ID card, credit card, label), or commercial product (e.g., optical disks, CDs, DVDs, packages of medical drugs), etc., for authentication purposes.

When used in the form of a base platform for an ID card, high value or other security document, the base diameter of the refractive or reflective focusing elements in the optical film material is preferably less than about 50 microns, preferably from about 5 to about 30 microns, and more preferably from about 10 to about 25 microns, while the total thickness of the inventive device is preferably less than or equal to about 3 millimeters (mm) including (but not limited to) thicknesses: ranging from about 1 to about 3 mm; ranging from about 500 microns to about 1 mm; ranging from about 200 to about 500 microns, ranging from about 50 to about 199 microns, and of less than about 50 microns.

When used in the form of a security strip, thread, patch, or overlay, the base diameter of the refractive or reflective focusing elements is preferably less than about 50 microns, preferably from about 5 to about 30 microns, and more preferably from about 10 to about 25 microns, while the total thickness of the inventive device is preferably less than about 50 microns (more preferably, less than about 45 microns, and most preferably, from about 10 to about 40 microns).

The security strips, threads, patches and overlays may be partially embedded within or mounted on a surface of a document. For partially embedded strips and threads, portions thereof are exposed at the surface of the document at spaced intervals along the length of the strip or thread at windows or apertures in the document.

The inventive device may be at least partially incorporated in security papers during manufacture by techniques commonly employed in the papermaking industry. For example, the inventive device in the form of a strip or thread may be fed into a cylinder mold papermaking machine, cylinder vat machine, or similar machine of known type, resulting in total or partial embedment of the strip or thread within the body of the finished paper.

The security strips, threads, patches and overlays may also be adhered or bonded to a surface of a document with or without the use of an adhesive. Bonding without the use of an adhesive may be achieved using, for example, thermal welding techniques such as heated platen press, ultrasonic welding, vibration welding, and laser fusing. Adhesives for adhering the inventive devices to a surface of a document may be one of hot melt adhesives, heat activatable adhesives, pressure sensitive adhesives, and polymeric laminating films. These adhesives are preferably crosslinkable in nature, such as UV cured acrylic or epoxy.

In another contemplated embodiment, the inventive device forms part of a label construction containing a transparent or translucent adhesive (i.e., the transparent thermoplastic material layer). The inventive device may be placed on the inside of a package, so that the synthetic images and static 2D images remain visible. In this embodiment, the base diameter of the refractive or reflective focusing elements of the optical film material is preferably less than about 50 microns, preferably from about 5 to about 30 microns, and more preferably from about 10 to about 25 microns, while the total thickness of the inventive device is preferably less than about 200 microns (more preferably, less than about 75 microns, and most preferably, from about 10 to about 50 microns).

While various embodiments of the present invention have been described above, it should be understood that they have been presented by way of example only, and not limitation. Thus, the breadth and scope of the present invention should not be limited by any of the exemplary embodiments.

We claim:

1. A laser markable optical device, which comprises:
an optical film material that comprises one or more arrangements of focusing elements and one or more arrangements of image icons disposed on opposing sides of an optical spacer layer, at least a portion of the focusing elements forming at least one synthetically magnified image of at least a portion of the image icons,
wherein at least one arrangement or layer within the optical film material is markable by laser energy, and
wherein static two dimensional images may be laser marked on or into the one or more laser markable arrangements or layers without damaging the focusing elements or the image icons of the optical film material.

2. A laser markable optical device, which comprises:
an optical film material that comprises one or more arrangements of focusing elements and one or more arrangements of image icons disposed on opposing sides of an optical spacer layer, at least a portion of the focusing elements forming at least one synthetically magnified image of at least a portion of the image icons; and
one or more layers located above and/or below the optical film material,
wherein at least one arrangement or layer within or layer above or below the optical film material is markable by laser energy, and
wherein static two dimensional images may be laser marked on or into the one or more laser markable arrangements or layers without damaging the focusing elements or the image icons of the optical film material.

3. The laser markable optical device of claim 1 or 2, wherein the optical film material comprises an arrangement of reflective focusing elements and an arrangement of image icons that are separated by an optical spacer layer, wherein one or more arrangements or layers located above the arrangement of reflective focusing elements is a laser markable arrangement or layer.

4. The laser markable optical device of claim 3, wherein the reflective focusing elements are metalized or coated with a high refractive index non-metallic material.

5. The laser markable optical device of claim 4, wherein the reflective focusing elements are coated with a high refractive index non-metallic material selected from the group consisting of zinc sulphide, indium tin oxide, and combinations thereof.

6. The laser markable optical device of claim 1, which is a stand-alone device that comprises an optical film material comprising an arrangement of refractive or reflective focusing elements and an arrangement of image icons that are separated by a laser markable optical spacer layer.

7. The laser markable optical device of claim 1 or 2, wherein the one or more arrangements or layers markable by laser energy are prepared using thermoplastic polymers selected from the group of polyethersulfone, polysulfone, polycarbonate, and polyphenylene sulfide.

8. The laser markable optical device of claim 7, wherein the one or more layers markable by laser energy are laser markable transparent polycarbonate films.

9. The laser markable optical device of claim 7, wherein the one or more layers markable by laser energy are laser markable clear polycarbonate sheets.

10. The laser markable optical device of claim 1 or 2, wherein the one or more layers markable by laser energy are prepared using one or more laser additives and one or more thermoplastic polymers selected from the group of polystyrene, styrene acrylonitrile, acrylonitrile butadiene styrene, polyethylene terephthalate, glycol-modified polyethylene terephthalate, polybutylene terephthalate and polyethylene.

11. The laser markable optical device of claim 10, wherein the one or more laser additives comprise carbon black.

12. The laser markable optical device of claim 1 or 2, which is made up of the optical film material, one or more underlying laser markable layers, and one or more thermal spacer layers positioned between the optical film material and the one or more underlying laser markable layers.

13. The laser markable optical device of claim 12, wherein the one or more thermal spacer layers are prepared using a clear thermoplastic material.

14. The laser markable optical device of claim 12, wherein the one or more thermal spacer layers has a thickness ranging from about 5 to about 500 microns.

15. A laser marked optical device prepared from the laser markable optical device of claim 1 or 2, wherein the one or more laser markable arrangements or layers has one or more laser marked static two dimensional images thereon.

16. A sheet material made from the laser marked optical device of claim 15.

17. A document made from the sheet material of claim 16.

18. A base platform made from the laser marked optical device of claim 15.

19. A document made from the base platform of claim 18.

20. A sheet material made from the laser markable optical device of claim 1 or 2.

21. A document made from the sheet material of claim 20.

22. A base platform made from the laser markable optical device of claim 1 or 2.

23. A document made from the base platform of claim 22.

24. The laser markable optical device of claim 1 or 2, wherein the optical film material comprises an arrangement of refractive focusing elements and an arrangement of image icons that are separated by an optical spacer layer, wherein one or more arrangements or layers located above the arrangement of image icons is a laser markable arrangement or layer.

25. The laser markable optical device of claim 2, wherein the one or more layers located above and/or below the optical film material include one or more transparent thermoplastic material layers that serve to achieve a desired overall thickness of the device, or if positioned as an outermost layer, provide the device with increased resistance to tampering or alteration and wear.

26. A laser markable optical device, which comprises:
an optical film material that comprises one or more arrangements of focusing elements and one or more arrangements of image icons disposed on opposing sides of an optical spacer layer, at least a portion of the focusing elements forming at least one synthetically magnified image of at least a portion of the image icons; and
one or more layers located above and/or below the optical film material,
wherein at least one arrangement or layer within or layer above or below the optical film material is markable by laser energy, and
wherein static two dimensional images may be laser marked on or into the one or more laser markable arrangements or layers without damaging the focusing elements or the image icons of the optical film material,
wherein the optical film material comprises an arrangement of encapsulated refractive focusing elements and an arrangement of image icons that are separated by an optical spacer layer, wherein one or more arrangements or layers located above the arrangement of image icons is a laser markable arrangement or layer.

27. The laser markable optical device of claim 26, wherein an outermost layer located above the optical film material is a transparent thermoplastic material layer.

28. The laser markable optical device of claim 27, wherein the transparent thermoplastic material layer has a thickness ranging from about 5 to about 500 microns.

29. The laser markable optical device of claim 26, wherein the refractive focusing elements are encapsulated using a material having a refractive index that is substantially or measurably different than the refractive index of the material used to form the focusing elements.

30. The laser markable optical device of claim 29, wherein the difference in refractive indices causes the focal length of the focusing elements to converge on the one or more arrangements of image icons.

31. The laser markable optical device of claim 29, wherein the encapsulating material is transparent, translucent, tinted, or pigmented.

32. The laser markable optical device of claim 31, wherein the encapsulating material is selected from the group of adhesives, gels, glues, lacquers, liquids, molded polymers, and polymers or other materials containing organic or metallic dispersions, provided the refraction of light is not completely disrupted.

33. A laser markable optical device, which comprises:
an optical film material that comprises one or more arrangements of focusing elements and one or more arrangements of image icons disposed on opposing sides of an optical spacer layer, at least a portion of the focusing elements forming at least one synthetically magnified image of at least a portion of the image icons; and
one or more layers located above and/or below the optical film material,
wherein at least one arrangement or layer within or layer above or below the optical film material is markable by laser energy, and
wherein static two dimensional images may be laser marked on or into the one or more laser markable arrangements or layers without damaging the focusing elements or the image icons of the optical film material, wherein the laser markable optical device is made up of the optical film material, one or more underlying laser markable layers, and one or more thermal spacer layers positioned between the optical film material and the one or more underlying laser markable layers, wherein the optical film material comprises an arrangement of encapsulated refractive focusing elements and an arrangement of image icons that are separated by an optical spacer layer.

\* \* \* \* \*